(12) United States Patent
Zhang

(10) Patent No.: US 12,252,040 B2
(45) Date of Patent: Mar. 18, 2025

(54) MOBILE SOLAR CHARGING FACILITY

(71) Applicant: Qi Zhang, Kunming (CN)

(72) Inventor: Chenghui Zhang, Kunming (CN)

(73) Assignee: Qi Zhang, Kunming (CN)

( * ) Notice: Subject to any disclaimer, the term of this patent is extended or adjusted under 35 U.S.C. 154(b) by 12 days.

(21) Appl. No.: 17/998,394

(22) PCT Filed: Jul. 9, 2021

(86) PCT No.: PCT/CN2021/105448
§ 371 (c)(1),
(2) Date: Nov. 10, 2022

(87) PCT Pub. No.: WO2022/057409
PCT Pub. Date: Mar. 24, 2022

(65) Prior Publication Data
US 2023/0182622 A1  Jun. 15, 2023

(30) Foreign Application Priority Data

Sep. 17, 2020 (CN) .......................... 202010976669.X

(51) Int. Cl.
*B60M 7/00* (2006.01)
*B60L 3/00* (2019.01)
(Continued)

(52) U.S. Cl.
CPC ........... *B60M 7/003* (2013.01); *B60L 3/0069* (2013.01); *B60L 5/38* (2013.01); *B60L 50/40* (2019.02);
(Continued)

(58) Field of Classification Search
CPC ........... B60L 53/51; B60L 50/40; B60L 5/38; B60M 1/30; B60M 3/00; B60M 7/003;
(Continued)

(56) References Cited

U.S. PATENT DOCUMENTS

| | | | | |
|---|---|---|---|---|
| 4,220,229 A | * | 9/1980 | Wampfler | H02G 5/04 |
| | | | | 191/23 A |
| 2009/0045773 A1 | * | 2/2009 | Pandya | H02J 50/90 |
| | | | | 320/108 |

(Continued)

FOREIGN PATENT DOCUMENTS

| | | |
|---|---|---|
| CN | 103935266 A | 7/2014 |
| CN | 104192017 A * | 12/2014 |

(Continued)

OTHER PUBLICATIONS

First Office Action in corresponding CN 202010976669 dated Sep. 15, 2022 (pp. 1-6). (Original and English translation).

(Continued)

*Primary Examiner* — Richard Isla
*Assistant Examiner* — Johali A Torres Ruiz
(74) *Attorney, Agent, or Firm* — Millen, White, Zelano & Branigan P.C.; Wan-Ching Montfort

(57) ABSTRACT

A mobile solar charging facility. The present invention relates to power supply and charging techniques for a mobile electric apparatus during movement, and in particular to such a facility having a combined technique of a solar photovoltaic battery and solar thermal power generation, and matching techniques and extended applications related to light compensation, energy storage, etc. The present invention is aimed at solving the problem of charging an electric vehicle when traveling. A highly cost-effective solar power source is used for power supply. The technical solutions of a contact rail and a collector shoe are used for mobile power supply and charging. An arc extinction circuit and an energy storage super-capacitor are provided in a line, and a safety protection measure is provided. A condenser lens and a compensation lens which can increase a power (Continued)

generation amount and do not need to be tracked as provided for solar power generation.

6 Claims, 5 Drawing Sheets

(51) Int. Cl.
| | |
|---|---|
| *B60L 5/38* | (2006.01) |
| *B60L 50/40* | (2019.01) |
| *B60L 53/51* | (2019.01) |
| *H02S 40/44* | (2014.01) |
| *F24S 23/30* | (2018.01) |
| *F24S 23/74* | (2018.01) |
| *H02S 20/21* | (2014.01) |
| *H02S 40/22* | (2014.01) |

(52) U.S. Cl.
CPC .............. *B60L 53/51* (2019.02); *H02S 40/44* (2014.12); *B60L 3/0015* (2013.01); *F24S 23/30* (2018.05); *F24S 23/74* (2018.05); *H02S 20/21* (2014.12); *H02S 40/22* (2014.12)

(58) Field of Classification Search
CPC ..... Y02T 10/70; Y02T 10/7072; Y02E 70/30; Y02E 10/40; Y02E 10/52; H02S 40/22; H02S 40/44; H02S 20/21; H02J 2310/48
See application file for complete search history.

(56) References Cited

U.S. PATENT DOCUMENTS

| | | | |
|---|---|---|---|
| 2012/0013300 A1* | 1/2012 | Prosser | B60L 53/30 320/109 |
| 2019/0263266 A1* | 8/2019 | Algret | B60M 1/34 |
| 2020/0290482 A1* | 9/2020 | Jones | B60K 1/00 |
| 2021/0253241 A1* | 8/2021 | Haran | B64U 50/34 |

FOREIGN PATENT DOCUMENTS

| | | | |
|---|---|---|---|
| CN | 104821048 A | | 8/2015 |
| CN | 104821048 B | | 3/2017 |
| CN | 108284745 A | | 7/2018 |
| CN | 108825458 A | | 11/2018 |
| CN | 109591636 A | * | 4/2019 |
| CN | 110319413 A | | 10/2019 |
| CN | 111572379 A | | 8/2020 |
| CN | 113138461 A | | 7/2021 |

OTHER PUBLICATIONS

Second Office Action in correspnding CN 202010976669 dated Dec. 19, 2022 (pp. 1-5) (Original and English translation).

* cited by examiner

MOBILE SOLAR CHARGING FACILITY

CROSS-REFERENCE TO RELATED APPLICATION

This application is a national stage of International Application No. PCT/CN2021/105448, filed on Jul. 9, 2021, which claims priority to Chinese Patent Application No. 202010976669.X, filed on Sep. 17, 2020. Both of the aforementioned applications are hereby incorporated by reference in their entireties.

TECHNICAL FIELD

The present disclosure relates to a power supply and charging technique for a mobile electric apparatus during movement, and particularly to a facility having a combined technique of a solar photovoltaic battery and solar thermal power generation, and matching techniques and extended applications related to light compensation, energy storage, etc.

BACKGROUND

In the prior art, storage batteries for vehicles such as electric vehicles have the defects of long charging time and the like, affecting promoted application. The investment for wireless mobile charging investment is high. Rail vehicle can achieve mobile power supply, but an electric vehicle does not travel on a rail. A plurality of electric vehicle mobile charging solutions has been publicly available in this technical field, but they have not been popularized and applied.

Power generation of solar photovoltaic cell products is easy to achieve, but the price of photovoltaic cell products is relatively high. At present, the strong illumination on the solar photovoltaic cell components is maintained by electromechanical tracking (or additional light condensation) in general, thus improving the utilization of the device and increasing the power generation amount. However, the price of electromechanical tracking equipment is high, and the cost of maintenance is also high when working outdoors. The photovoltaic cell itself can achieve solar power generation without electromechanical tracking, but strong illumination cannot be kept for a long time, and the power generation resources of the photovoltaic cell cannot be sufficiently utilized. Experiments for increasing the power generation amount by reflecting sunlight onto a photovoltaic cell module plate with a mirror without electromechanical tracking are common. However, the angle of sunlight is changed from year to year and from day to night, especially the sunlight reflected by the limited area of the mirror does not guarantee full coverage for a longer time for the PV module panels, and sometimes, the shadow of the mirror even falls on the photovoltaic cell module plate. Therefore, for the photovoltaic cell module panel in a series connection mode at present, the total current usually can only reach the current of the weakest illumination part, at this time, the temperature of the solar photovoltaic cell module panel rises, and the photoelectric conversion efficiency may decrease. In order to increase the temperature of a working medium, the solar thermal power generation apparatus generally uses electromechanical tracking equipment to track sunlight and focus the sunlight at a high magnification. In addition, as the working medium needs to enter and exit from the solar heat collector, and the apparatus is more complex. Solar water heaters are simple, but the temperature for power generation is generally not enough. As the solar energy cannot continuously and stably supply energy source for a long time, the energy storage is also important, but its cost is still too high.

SUMMARY

An objective of the present disclosure is to achieve stable mobile power supply and charging of an electric vehicle traveling at a high speed at a low cost.

Another objective of the present disclosure is to keep strong illumination on a solar power generator under the condition that electromechanical tracking is not needed, thus further overcoming some defects in the prior art. The solar power supply of the mobile charging facility with high-cost performance is achieved.

To this end, the technical solution of the mobile solar charging facility is as follows: (the technical solution is used for a situation that the electric vehicle travels at a speed below 160 km per hour).

The mobile power supply and charging of the electric vehicle traveling at a high speed is achieved, with the specific facility measures as follows. (1) The existing mobile power supply techniques, such as the related techniques of a high-speed rail and a subway, are used for reference. (2) A technical task is completed through cooperation of contact slide rails (301) and (311) and a (switching) collector trolley, and a technical solution of mobile power supply and charging is completed by using the contact slide rails (301) and (311), a collector shoe (303), a (traveling) collector wheel (302), and an electromechanical connecting arm (304). (3) A plurality of technical measures is used: one of the key techniques is that an electromechanical connecting arm (304) is used for completing electrical and mechanical connection of the 'collector trolley' (308) and an electric vehicle by using electromagnetism. Single-sided power supply is a weaker mechanical connection, which is used when parking; both sides supplying power simultaneously to form opposite magnetic poles is a stronger mechanical connection, which is used when an electric vehicle travels and drags (the collector trolley); both sides supplying power simultaneously to form like magnetic poles is provided for a situation needing separation; when the traction force exceeds the electromagnetic force, the collector trolley may be forcibly separated. The electromechanical connecting arm is generally installed on the collector trolley and is provided with an automatic retracting mechanism, such that the electromechanical connecting arm can automatically retract when separated from the electric vehicle. Electrical contacts are arranged at the connecting positions of the electric vehicle and the collector trolley, and a charging power source is connected to an interface (202) by a spring-shaped cable. The electric connection is completed while the mechanical connection is made. The collector shoe and the 'collector wheel' of the same electrode may be connected in parallel to reduce opportunity of electrical disconnection; and an arc extinction absorption circuit (204), or an arc extinction absorption circuit (206) used during AC power supply, is installed. An automatic searching and aligning apparatus for the electromechanical connecting arm may also be installed (an autonomous and automatic electric driving traveling apparatus may also be installed on the switching 'collector' trolley) to achieve automatic connection. The electromechanical connecting arm is provided with a retraction spring mechanism and a recovery wheel rope winder with a clockwork spring. Four wheels of the trolley can rotate left and right, with rotation angles limited to 15° and below with a limiting mechanism; a contact rail is in corresponding fit with the wheels at a curve, lower portions of the wheels incline outwards by 5° to 25°, and the rail inclines correspondingly. Anti-collision buffer structures are also installed at two ends of the (switching) 'collector' trolley (308). An energy storage super-capacitor (205) is installed to improve stability of the system power supply. The arc extinction absorption circuit is installed to reduce electric interference and mechanical wear. An online automatic bill collector is installed to complete deduction of electricity bills.

Such mobile charging facility can achieve the following technical effects. (1) the (switching) 'collector' trolley in the middle for transition can be made very light, due to use of the weight of a charged vehicle, the 'collector wheel' and the collector shoe (which are kept at a proper pressing force by means of springs) can properly press conductive contact slide rails to guarantee their good contact and passing of the current; while the charged vehicle is slightly lifted (the force is controlled by means of spring), so there is no increase in energy consumption. (2) The 'collector' trolley may stably travel on a smooth rail, due to a movable universal joint and the springs, the connection between the charged vehicle and the trolley enables the charged vehicle to have little effect on the trolley when bumping and swinging left and right, and thus the stability and reliability of the charging are guaranteed. (3) The trolley is connected to the charged vehicle by means of the electromechanical connecting arm, the electromechanical connecting arm is flexibly connected to the trolley, and the mechanical connecting arm is connected to the charged vehicle by electromagnetic force, and an interface is provided at a tail of the charged vehicle. The 'electromechanical connecting arm' can automatically retract to snap into a safe position by means of the spring. In addition, the downward force bearing point of the trolley is located at its center, thus the control is easy, and the safety is achieved. (4) Four wheels at the front and rear of the trolley can rotate left and right to make the trolley pass through the curve flexibly; and the wheels incline outwards by 5° to 25° to achieve a certain limiting function. (5) The arc extinction absorption circuit is installed to reduce electric interference and mechanical wear. (6) An energy storage super-capacitor is installed to reduce fluctuation of power supply.

The solar power generation and the mobile charging facility are combined to generate these technical effects as follows: the photovoltaic power generation with compensation is arranged above a charging line, which has little effect on the ground ecological illumination, and a support and the space are fully utilized. The photothermal power generation is arranged on the roadside, the wasteland is easy to find, the lines for charging are short and the losses are low.

A solar system is adopted for power supply, with the specific technical solution as follows: in a solar photovoltaic array, a plurality of diffuse reflection plates are placed on a back surface of a front photovoltaic cell (or assembly), and the diffuse reflection plate for the foremost photovoltaic cell (or assembly) is arranged with reference to other parts, and the specific parameters such as the positions and the sizes of the diffuse reflection plates are as follows: (1) widths of the diffuse reflection plates are equal to, or larger than or smaller than, widths of the photovoltaic cells (or assemblies), and the lengths of the diffuse reflection plates cannot be long enough to affect direct irradiation of the sunlight to the photovoltaic cells (or assemblies), and generally, the longer the diffuse reflection plates, the more the light reflected to the photovoltaic cells (or assemblies); (2) positions and angles of the diffuse reflection plates cannot affect direct irradiation of the sunlight to the photovoltaic cells (or assemblies); (3) in general, the photovoltaic cells (or assemblies) and the diffuse reflection plates are arranged in a south-north mode, directly facing the south or north, the angles and the distances of the photovoltaic cells (or assemblies) are determined in such a way (for a system used all year round): the installation angles of the photovoltaic cells (or assemblies) are the local latitude plus 10° to 15°, and the distance between the photovoltaic cells (or assemblies) is 2.5 to 3.5 times of the height, 3 times in general. Therefore, the sunlight at noon of a certain day may perpendicularly (or nearly perpendicularly) irradiate the photovoltaic cell (or assembly), or it may also be designed that the sunlight at noon of the winter solstice perpendicularly and directly irradiates a solar photovoltaic cell panel, and the angles and positions of a plurality of diffuse reflection plates are determined by the following method (and modified by experimental verification): a straight line perpendicularly passing through a central point is set as an assumed normal line; at noon in the winter solstice, the sunlight irradiates a center of the diffuse reflection plate close to the photovoltaic cell (or the assembly) and is reflected to the center of the photovoltaic cell (or the assembly) according to a normal line; and at noon of the summer solstice, the sunlight irradiates to the center of the other diffuse reflection plate and is reflected to the center of the photovoltaic cell (or the assembly) according to a normal line. This part has a total of 24 diffuse reflection plates which are arranged using above method in the 24 solar terms, with the essence that the light reflected to the photovoltaic cell (or the assembly) by the diffuse reflection plates at a certain time is the strongest. Such sunlight compensation may also be performed in the morning and afternoon, which is done by adding two diffuse reflection plates and referring to the above method, choosing the equinox and the autumnal equinox for the time, and 9 o'clock and 15 o'clock for the moment. The simulation of the angle of the sunlight may be determined and tested as well, due to the fact that there is a diffuse reflection plate arranged at a top of the solar photovoltaic cell panel. The specific details can be known from the embodiments of the present disclosure, if the field allows, two convex reflection plates can be respectively arranged at the positions 40° to 50° south by east and 40° to 50° south by west (an arc convex reflection plate can be made to replace 24 diffuse reflection plates according to an entire structure shape formed by 24 diffuse reflection plates, and the reflection plate (402) is shown in FIG. 4), the installation angle is considered in the case of the small solar altitude angle, and the installation angle and the size (proportion) of a reflection plate (also called an illumination compensation lens) arranged in a due-south direction (in the northern hemisphere) are marked on FIG. 4 (FIG. 4 is suitable for the area north of the Tropic of Cancer in the northern hemisphere, for the area south of Tropic of Cancer in the northern hemisphere, the illumination compensation lens (arc) on the figure can be properly dragged downwards and towards a direction of the solar cell, whether the requirements are satisfied can be simulated and checked on the figure; certainly, FIG. 4 and this method are also suitable for the southern hemisphere). (The solar thermal power generation apparatus included in the complete set of facility is described in detail in specific embodiments).

In accordance with the technical solution, the present disclosure has the following remarkable features: in the aspect of mobile charging, the electric vehicle at a high speed per hour is allowed to have a certain bumping and small range of maneuvering left and right, so the stable charging during moving is achieved, the whole apparatus is relatively safe with low engineering economic cost. In the aspect of power supply of the mobile solar charging system, the total power generation amount and the cost performance of the photovoltaic power generation products are improved. In accordance with the present disclosure, the fixed solar photovoltaic cells or assemblies thereof can obtain more illumination at a certain latitude, all year round and all day long. When the illumination on the solar cell panel is weak, a cheap reflective material is used for reflecting light to compensate for the weak illumination, thus making the photovoltaic power generation product reach or approach rated electric quantity output for a long time. The power generation amount is improved using the cheap material, thereby improving cost performance. The application value of the present disclosure is improved due to extension of the application. Apparently, such highly cost-effective solar apparatus can be used in other similar occasions.

DETAILED DESCRIPTION OF THE EMBODIMENTS

Figure 1:
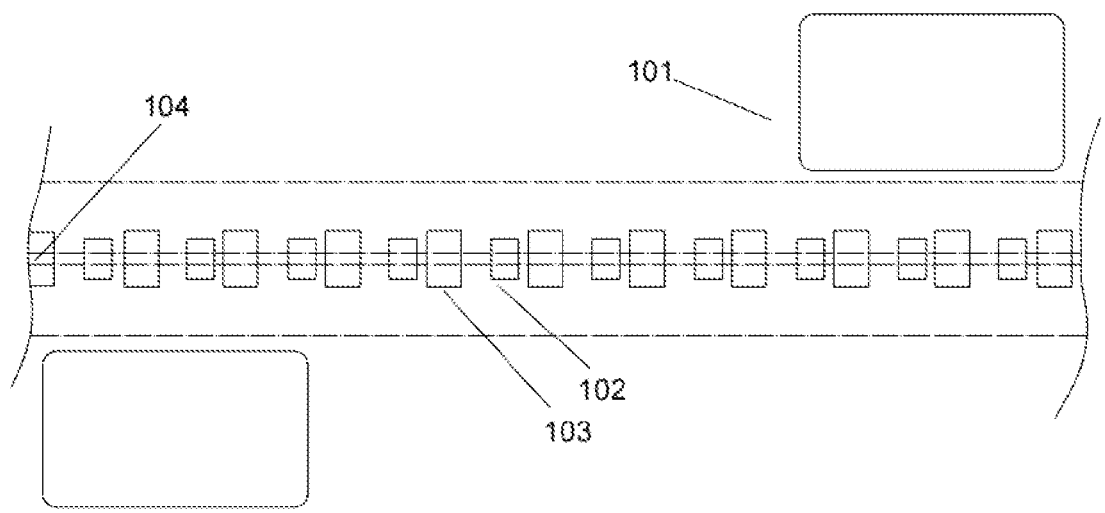
FIG. 1 is a layout plan of a solar power generation apparatus of a mobile solar charging facility, in the figure: photothermal power generation (101), solar cell panel (102), illumination compensation lens (103), highway median strip (104).
Figure 2:
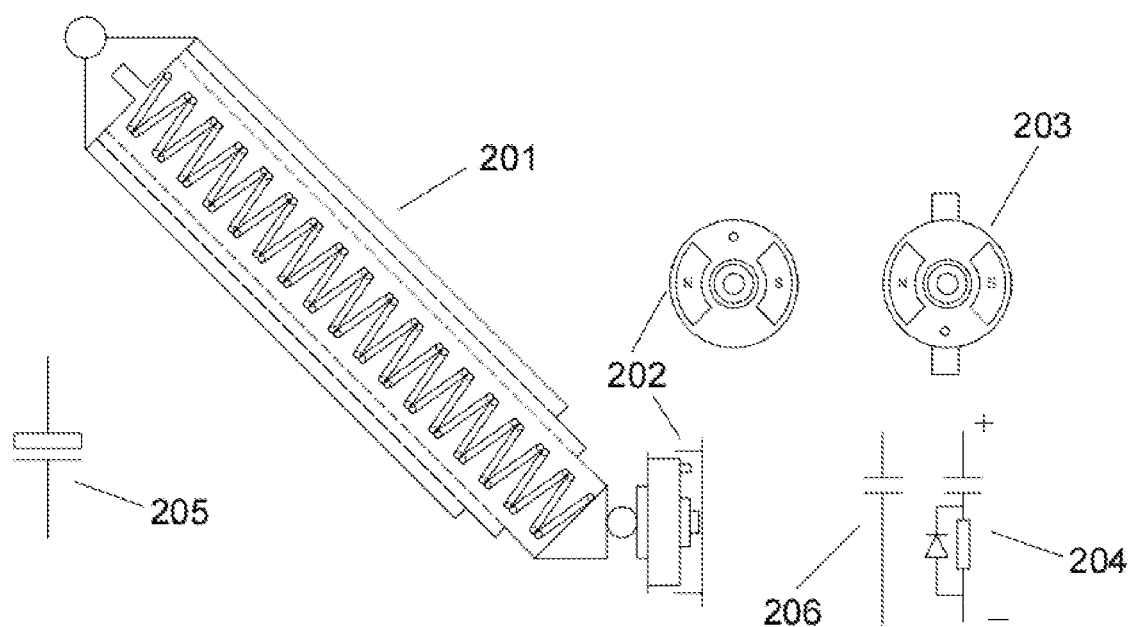
FIG. 2 is a schematic diagram of a structure and support devices of an electromechanical connecting arm, in the figure: electromechanical connecting arm (201), connecting interface (202) with a telescopic protective housing, connecting interface (203) on an electric vehicle, first arc extinction absorption circuit (204), second arc extinction absorption circuit (206), energy storage super-capacitor (205).
Figure 3:
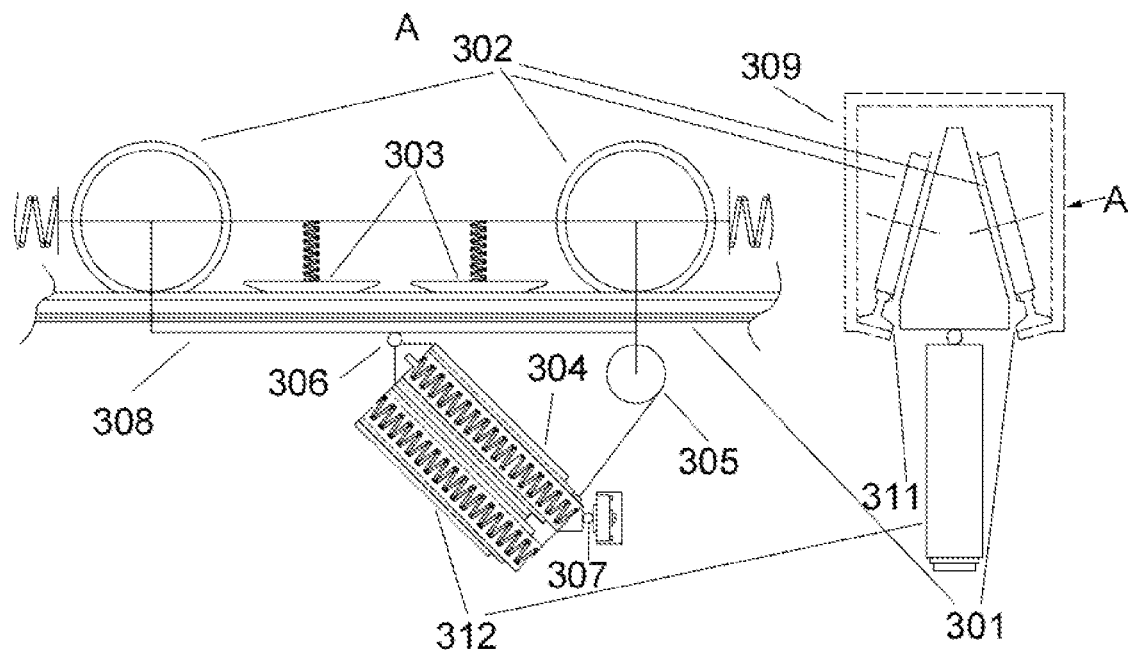
FIG. 3 is a schematic diagram of mobile power supply and charging work for an electric vehicle, in the figure, first contact slide rail (track) (301), second contact slide rail (track) (311), traveling wheel (may be used as 'collector wheel') (302), collector shoe (303), electromechanical connecting arm (304), (collector) trolley (308), recovery wheel rope winder (305), universal joint (306), universal joint (307), lower hollow support (309) for bearing contact slide rail, connecting cable telescopic protective casting (312) linked by the electromechanical connecting arm (304).
Figure 4:
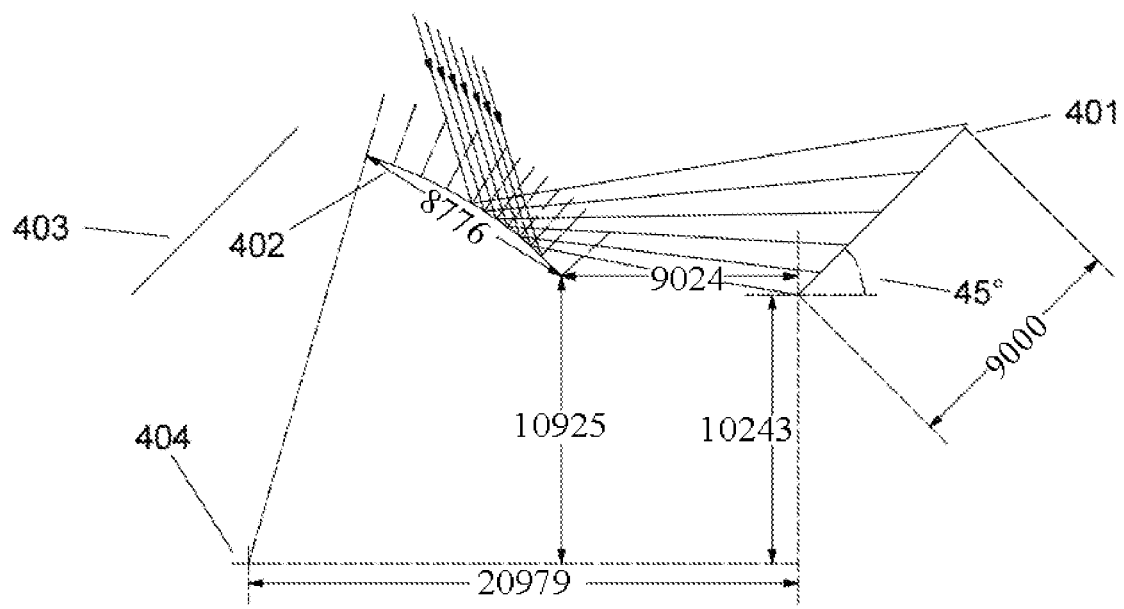
FIG. 4 is a structure, size and effect diagram of a solar photovoltaic power generation panel and compensation lens combination, in the figure, illumination compensation lens (402), illumination-compensated solar cell panel (401), front solar cell panel (403), and center (404) of arc of illumination compensation lens (402).
Figure 5:
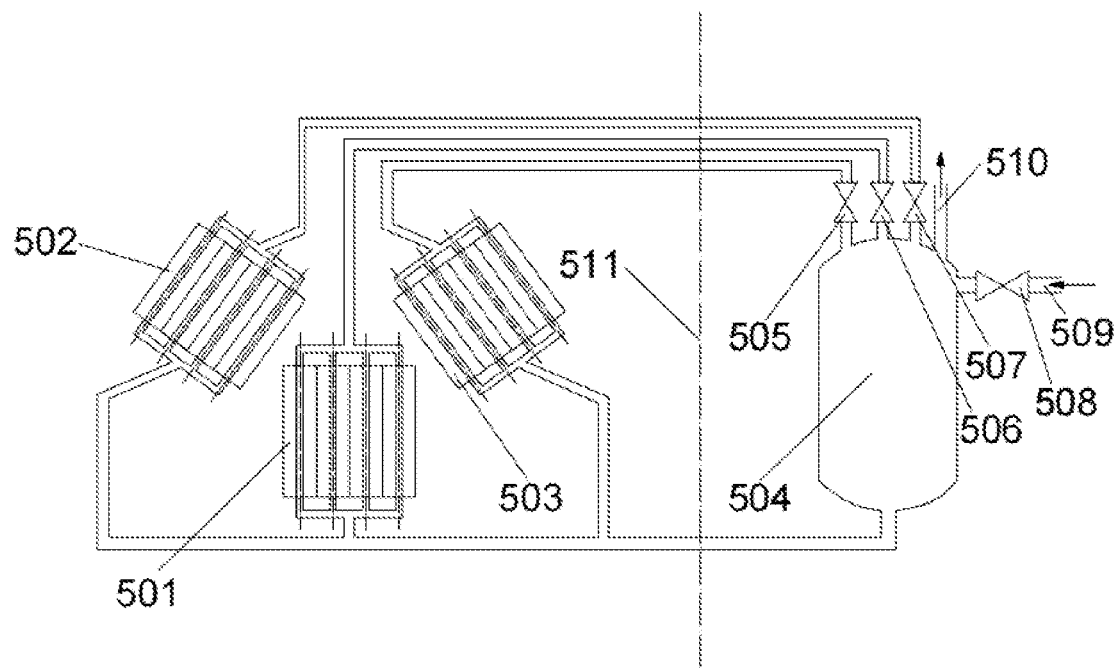
FIG. 5 is a structure schematic diagram of a solar thermal system, in the figure, due-south composite lens photothermal assembly (501), westerly composite lens photothermal assembly (502), easterly composite lens photothermal assembly (503), steam pocket (504), first electromagnetic valve (505), second electromagnetic valve (506), third electromagnetic valve (507), fourth electromagnetic valve (508), liquid working medium inlet (509), vapor-state working medium outlet (510), view division (511), top view on the left, and front view on the right.
Figure 6:
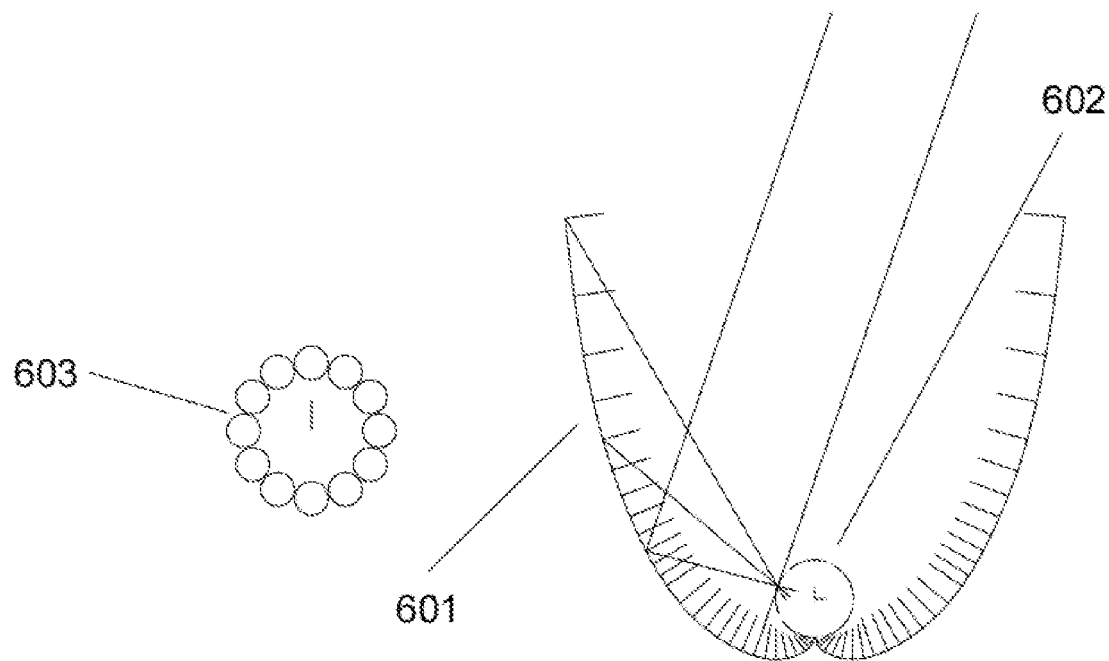
FIG. 6 is schematic diagram of a solar thermal condenser lens and a heat collector, in the figure, condenser lens (601), heat collector (602), heat collector (603) capable of improving medium temperature.
Figure 7:
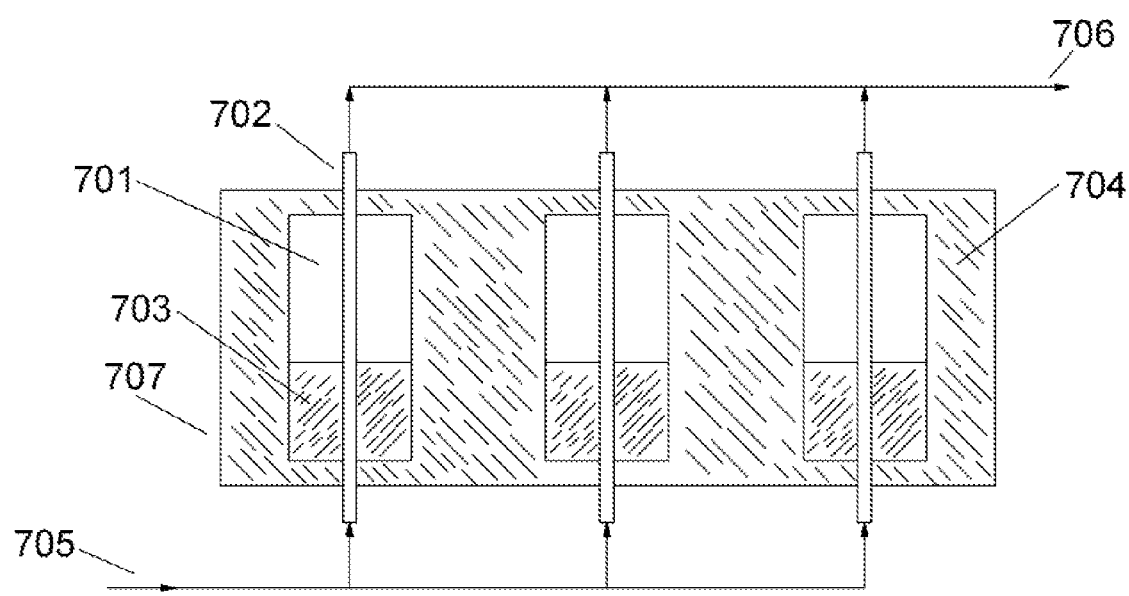
FIG. 7 is a schematic diagram of a heat storage apparatus, in the figure, latent heat substance storage tank (701), heat-carrying medium pipeline (702), latent heat substance (703), sensible heat substance (704), heat-carrying medium main inlet pipe (705), heat-carrying medium main outlet pipe (706), heat storage pool (707).
Figure 8:
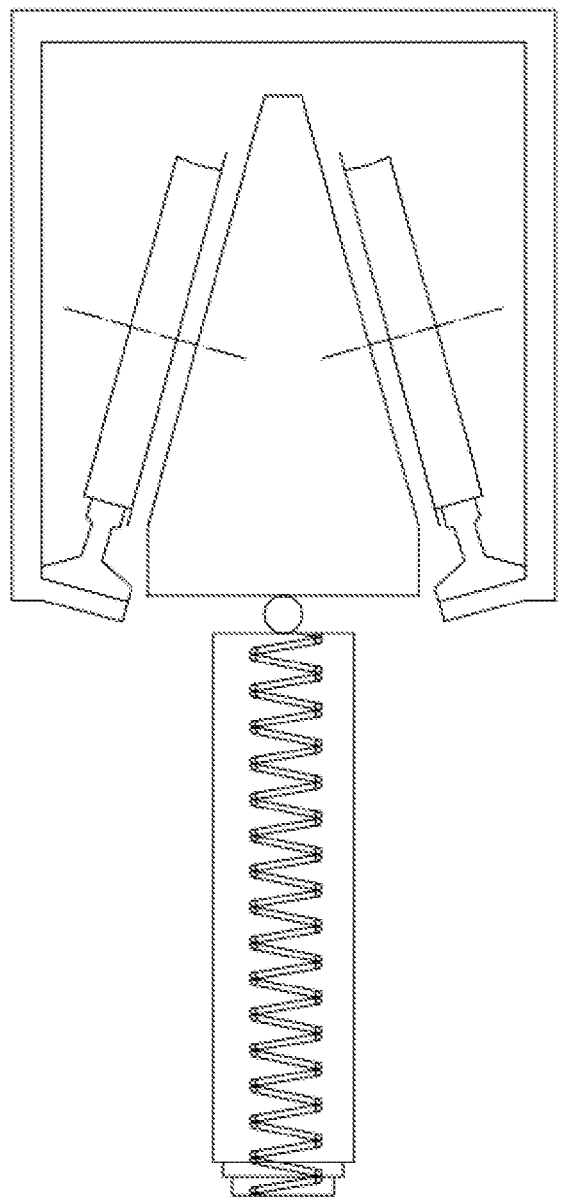
FIG. 8 is a structural schematic diagram of a mobile solar charging facility.

By analyzing and drawing on the prior art, improvement measures (urban railways, trolleybuses, subways, electrified railways, high-speed rails, factory mobile power supply techniques and the like) are proposed. A plurality of electric vehicle mobile charging solutions has been publicly available in the technical field but are not popularized in a large area. By considering these cases, these technical points and considerations are proposed.

(1) Two lines are used for power supply, and one line needs to be reliably grounded for safety. Direct current power supply or alternating current power supply may be used, and an arc extinction absorption circuit is provided. When a vehicle jumps and a pantograph and a conductive cable are in contact, or separated from, each other (in a normal condition, a load needs to be disconnected at first), electric sparks possibly occurring between the pantograph and the conductive cable may be greatly reduced, thus reducing unproductive consumption of electricity and the unnecessary loss of the pantograph and the conductive cable, as well as reducing radio interference from electric sparks.

(2) A higher voltage (e.g., 1,500 volts, and a lower voltage can be adopted during a test period) is adopted to reduce the current passing between the pantograph and the conductive cable.

(3) In a case that there are two pantographs on an electric vehicle, a length of each pantograph needs to be smaller than a line distance between two power supply lines, thus guaranteeing enough safety clearance.

(4) Two end heads of the pantograph are arc-shaped so as to reduce impact caused by abnormal transverse entering and exiting; and the end head of the power supply wire is also arc-shaped so as to reduce the impact caused by abnormal longitudinal entering and exiting. A position of the grounding wire allows the pantograph to be advanced before the grounding wire is released.

(5) An optical scanning or electric induction sensor is installed on the electric vehicle, and a state of the pantograph is determined using position relative signals given by the sensor: standby or contact. The pantograph is fully retracted when not in use.

(6) A mode of contact first and then power-on, and power-off first and then disengagement is employed.

(7) Compressed air enters the "pantograph rack" cylinder through large holes and micro holes, the compressed air entering through the large holes are configured to ensure that the pantograph rises timely, and the compressed air entering through micro holes are configured to keep the cylinder air pressure and ensure rapid deflation when abnormal, thereby putting down the pantograph rapidly.

(8) Materials and structures of the power supply line and the pantograph refer to existing rail electric vehicles, for example, the line is made of titanium alloy with good conductivity and wear resistance, and the pantograph is made of a graphite sliding plate, when the graphite sliding plate is seriously abraded to the end point of the service life or is damaged or broken, the compressed air for supporting can rapidly escape to make the pantograph rack to be rapidly put down.

(9) The trend of the line is "zigzag", the amplitude of the "zigzag" is smaller, leaving some room for the electric vehicle to maneuver left and right. It is guaranteed that the line slide in the middle of the graphite sliding plate in normal straight traveling, the sliding distance is one third of the length of the graphite sliding plate, and the remaining two thirds are left for maneuvering.

(10) A line traveling mark is arranged on the traveling line to guarantee that the power supply line slides in the middle of the graphite sliding plate of the pantograph during traveling. When an auto pilot is used, the sliding distance is increased to two thirds of the length of the graphite sliding plate, and the remaining one third is left for maneuvering. During automatic driving, the mark on the line is scanned by the sensor for identification.

(11) A way of mobile charging pile may be employed: there is a transversal ultra-thin trolley serving as a mobile charging pile is arranged on one side of the road, the trolley is hung on the rail and can walk on the rail, the trend of the contact net line is also zigzag, and the pantograph is also used for power taking. A camera is installed at the entrance of this chargeable road so as to obtain information such as a license plate of a to-be-charged vehicle; and meters for charging and electricity consumption are installed on the trolley, and electricity consumption data is uploaded by the Internet. A female socket on a universal arm is connected to a charged device (electric vehicle) in a manual or automatic manner. Another solution is that all mechanisms of the trolley are installed on a to-be-charged vehicle, when the to-be-charged vehicle is parked or in a traveling state, the trolley can be automatically hung on the rail to complete the charging process, or the trolley can be separated from the rail to be put away. The details are analyzed in the figures. The pantograph is a plastic insulated base plate with two graphite sliding plates arranged in a single line. Attention should be paid to the insulation gap, and the problem of short circuit caused by rainwater.

(12) In order to solve the problem of imbalance of solar power generation, energy storage facilities can be used for storing and providing electric power. A heat and energy storage facility is provided here, which is provided with steel-container shaped heat storage units which are tightly arranged in a regular shape. The heat storage units are hollow, pure water is placed in the heat storage units to drain off other gases. An iron chain is arranged on a steep hillside, a box body filled with cheap stones is placed on the iron chain, and the iron chain is connected to a driving power generation system to achieve energy storage and power supply supplement. The driving power generation system may also use storage batteries, and can be connected to the power grid, conditionally. Along the charging line, adaptive mirror anti-dazzle LED lamp is adopted to intelligently control illumination of charged vehicle, only a signal lamp needs to be turned on for vehicle on the charging line, and a distance between the front vehicle and the rear vehicle should be controlled.

The charging and power supply for the electric vehicle may be completed using a mobile charging and power supply module. The module runs on an aerial elastic nylon hollow monorail and is limited to the left and the right. Conductive cables are arranged on two sides of the monorail, the trend of the titanium alloy conductive cables is double zigzag, and a graphite nylon hollow pantograph is configured to supply power. The module and the charged vehicle are in pantograph arm flexible electromechanical connection, the compressed air and the tension of the pantograph force the pantograph arm to be opened to lift the pantograph up to work, and dragging and charging connection are both in the middle of the rear surface of the top of the vehicle. The compressed air is generated by a micro air pump, double loops are used for power supply, a steam pocket and a cylinder are connected by a micro pipeline, and the loss of pressure is caused when the graphite is broken or leaked. Force-limiting fusing separation is adopted in emergency, a fuse protector is made of a foam sponge aluminum material, the cable is rapidly taken back, and it is guaranteed that a rope head is soft and light to avoid new damage. The module walks in a passive and active manner. The module is dragged by a charged vehicle in the passive manner, a module walking motor generates electricity to return to the grid. Gating frequency conversion and current-limiting power supply are adopted in the active manner. Active and passive conversion is performed through asynchronous sliding. An intelligent network is provided for mobile billing. The distance between the modules during movement is intelligently controlled. An intelligent vehicle finding module is provided. The separation is divided into: normal automatic separation, laser positioning separation, mechanical limiting emergency separation, and recovery.

Such mobile charging module, referred to as a mobile charging pile, may also walk on two lines formed by connecting steel pipes. One pipeline is used for bearing, and the other pipeline is used for limiting; the electric vehicle is electrically connected to the mobile charging module using a magnetic connector assembly to achieve the electric connection therebetween. The magnetism of the magnetic connector assembly is achieved by virtue of the current and can be controlled by the current. There are two walking manners for the mobile charging module: dragging by an electric vehicle and electric self-walking. The tension of the arm is limited, and demagnetization and separation are performed after power failure. The tension of the arm is limited, and the arm can be rapidly folded and retracted to be stored after being separated.

In general, the critical point of the technical solution of the mobile charging module is the important idea of the solution that a pantograph and a collector shoe need to be installed on a carrier moving stably, where a moving apparatus on a rail is available. The carrier is required to properly press the rail to properly limit the left-right moving range. When the carrier is small in bounce, the power supply of either the conductive cable or the contact rail and the contact of the pantograph or the collector shoe in the moving process are good. Certainly, other technical measures such as an arc extinction absorption circuit are also included, the technical solution of the present disclosure and the technical measures cooperatively guarantee the normal power supply and charging work of the electric vehicle.

To this end, by comparing, concentrating, integrating and improving above techniques, the specific technical solution of the mobile solar charging facility is proposed (the optimal solution of the present disclosure, which is used for an electric vehicle traveling at a speed below 160 km per hour):

The mobile power supply and charging of the electric vehicle traveling at a high speed can be achieved, with the specific facility and measures as follows: (1) it is a mobile power supply and charging facility; (2) a mobile power supply and charging solution is completed by using contact slide rails (track) (301) and (311) and a switching 'collector trolley', and utilizing the contact slide rails (301) and (311), a collector shoe (303), a (traveling) 'collector' wheel (302), and an electromechanical connecting arm (304); (3) a plurality of technical measures are used: one of the key techniques is that an electromechanical connecting arm (304) is used for completing electrical and mechanical connection between the 'collector trolley' (308) and an electric vehicle by using electromagnetism. Single-sided power supply is a weaker mechanical connection, which is used when parking; both sides supplying power simultaneously to form opposite magnetic poles is a stronger mechanical connection, which is used when an electric vehicle travels and drags (the collector trolley); both sides supplying power simultaneously to form like magnetic poles is provided for separation; and forced separation is achieved when the traction force exceeds the electromagnetic force. The electromechanical connecting arm is generally installed on the collector trolley and is provided with an automatic retracting mechanism, such that the electromechanical connecting arm can automatically retract when separated from the electric vehicle. Electrical contacts are arranged at the connecting positions of the electric vehicle and the collector trolley, and the electric connection is completed while the mechanical connection is made. The collector shoe and the 'collector wheel' of the same electrode may be connected in parallel to reduce the opportunity of electrical disconnection; and a perfect arc extinction absorption circuit is installed. If required, an automatic finding and aligning apparatus for an electromechanical connecting arm may also be installed to achieve automatic connection. A wireless network device for automatic billing and paying is also installed to complete the deduction of electricity bills. The trolley always travels on the contact slide rails, the lines are located at two sides of the road, and two contact slide rails may also be arranged in parallel up and down, and the contact slide rail at the lower position is grounded.

An apparatus for the trolley to enter and exit is installed: there is a cableway above the line, the trolley which is not in use is hung on the cableway, and the trolley to be used is placed on the line.

A photovoltaic power generation facility is arranged above one side of the road, and the solar thermal power generation facility is arranged beside the road.

These techniques and their combination may generate the following remarkable features: 1. the photovoltaic power generation with compensation is arranged above a charging line, which has little effect on the ground ecological illumination, and a support and the space are fully utilized. The photothermal power generation is arranged on the roadside, the wasteland is easy to find, the lines for charging are short and the losses are low. The 'collector' trolley for charging in the middle for transition can be made very light, due to the use of the weight of a charged vehicle, the 'collector wheel' and the collector shoe can press conductive contact slide rails to guarantee their good contact and the passing of the current; while the charged vehicle is slightly lifted (the force is controlled by means of spring), so there is no increase in energy consumption. 3. The 'collector' trolley may stably travel on a smooth rail, due to a movable universal joint and the springs, the connection between the charged vehicle and the trolley enables the charged vehicle to have little effect on the trolley when bumping and swinging left and right, and thus the stability and reliability of the charging are guaranteed. 4. The trolley is connected to the charged vehicle by means of the connecting arm, the connecting arm is flexibly connected to the trolley, and the connecting arm is connected to the charged vehicle by electromagnetic force, and an interface is provided at the tail of the charged vehicle. The connecting arm can move forward and can automatically retract to snap into a safe position. In addition, the downward force point of the trolley is located at its center, and thus the control is easy, and the safety is achieved. 5. Four wheels at the front and rear can rotate left and right, with rotation angles limited at 15° and below, such that the trolley can pass through a curve flexibly; and the wheels incline outwards 5° to 25° to properly limit the left and right of the trolley. 6. The arc extinction absorption circuit is installed to reduce electric interference and mechanical wear.

In the case, the optimal parameters of the convex reflector for achieving solar photovoltaic power generation compensation are found through experiments; and the optimal parameters of the composite reflector for achieving solar thermal power generation are also found through experiments.

Such solar photovoltaic compensation combined apparatus is also suitable for solar power generation for roads. The generated power may be used for mobile power supply and charging of an electric vehicle. The working principle of solar photovoltaic compensation in this case can also be applied to a solar thermal apparatus. In the case, the optimal parameters for achieving solar thermal compensation are also found through experiments, and a reflecting plate (402) (illumination compensation lens) may also be used to improve illumination.

In the prior art, the condensed solar medium-temperature and high-temperature photothermal apparatus is provided with an electromechanical tracking apparatus. The embodiment is a condensed solar medium-temperature and high-temperature photothermal apparatus, which employs a composite paraboloid concentrator (CPC) (composite lens for short) without the electromechanical tracking apparatus. The specific implementation of the present disclosure is as follows: a first composite lens photothermal assembly (501), a second composite lens photothermal assembly (502), and a third composite lens photothermal assembly (503) form a photothermal unit. Each composite lens photothermal assembly includes a composite lens and a photothermal element. The photothermal element of the composite lens photothermal assembly is formed by assembling a groove-shaped composite lens (601) and a photothermal receiver (602) matched with the groove-shaped composite lens (601) in performance, and all the photothermal elements have the same structures and parameters, and are only different in installation position and angle. The photothermal unit is further connected to a matched pipeline (the pipeline in FIG. 1), a steam pocket (504) and a heat storage pool (707), as well as a first electromagnetic valve (505), a second electromagnetic valve (506), a third electromagnetic valve (507) and a fourth electromagnetic valve (508) for control so as to form a photothermal system. The photothermal receiver may be provided with a photothermal isolator for improving the actual concentration ratio, and may also be in the form of a vacuum tube with a selective coating. An illumination compensation lens (402) is provided in front of the composite lens photothermal assembly.

The heat storage apparatus includes an outer tank body capable of well insulating heat and resisting pressure and a heat storage unit with extremely high heat storage efficiency. An interior of the heat storage unit is hollow, there is no other gas inside, and about 30% to 50% of the space in the heat storage unit is occupied by pure water; and efficient heat storage is achieved by mainly using the high latent heat of evaporation of water. Such heat storage unit has a high thermal storage capacity per unit weight (or per unit volume), and a ratio of thermal storage capacity to cost price is also relatively high. The heat storage unit is designed into a regular hexagon column in shape and can be compactly arranged; the cost may be low if using the round steel pipe as the heat storage unit. The heat storage unit is divided into an external heat type and an internal heat type. In the heat storage unit of the internal heat type, the flowing working medium is hard to be polluted, but arrangement of the pipeline for entering and leaving of the flowing medium is more complex and the cost is higher. Other heat storage fillers may be solid plus fluid, or all with fluid, and the fluid should submerge the heat storage unit and other heat storage fillers. Either the external heating type or the internal heating type has its own advantages, the use of which depends on the local conditions.

A heat storage body is placed in the heat storage tank, the heat storage tank needs to be evacuated for placing the liquid capable of being evaporated and boiled, with the evaporation heat as high as possible and cheap materials, such as water. The safety is better by placing other latent heat materials which do not produce gas (steam), such as a PE and PG mixture, mixed dissolved salt, hydroxide, and metal hydride, in the heat storage tank.

The embodiment also has the beneficial effects and obvious features as follows: there is no need of an electromechanical control apparatus for tracking the sunlight, with low economic (investment and management) cost. Compared with the disclosed solar tracking-free concentration technical solution, the illumination is stronger due to existence of the illumination compensation lens, and the temperature of a heated medium is higher. The facility can be used for solar thermal power generation, and can also be used for air conditioners, refrigeration, and medium heating.

Except for the photothermal receiver and the working reflecting surface of the composite lens and the illumination compensation lens, other surfaces of the composite lens and the illumination compensation lens and the outer surfaces of all other apparatus as well as the support can be coated with diffuse reflection coatings with strong reflectivity so as to increase the light received by the apparatus and increase the light received by other surrounding objects, thus facilitating the complementary use of solar energy (e.g. solar thermal photovoltaic complementary and biological complementary). To further improve the illumination on the plants below the photothermal apparatus, the reflecting materials or coatings for the composite lens and the illumination compensation lens may be made of spectral selective materials to achieve corresponding light transmission and reflection.

Related techniques in this case can be simplified and replaced under different requirements, as long as the technical features are the same in whole or in part as in this case, that is, within the scope of protection claimed by the present disclosure.

What is claimed is:

1. A mobile solar power supply and charging facility for an electric vehicle, wherein the facility for powering and charging the electric vehicle is powered by direct current or alternating current, the facility comprising:
   a first contact slide rail and a second contact slide rail for transmitting the power to the facility;
   wherein one contact slide rail, of the first contact slide rail and the second contact slide rail, is grounded, another contact slide rail of the first contact slide rail and the second contact slide rail is non-grounded, and a support for bearing the first contact slide rail or the second contact slide rails is insulated with the another contact slide rail;
   a collector trolley provided with a collector wheel and a collector shoe travels on the first contact slide rail and the second contact slide rail; and
   an electromechanical connecting arm capable of automatically retracting, keeping electrical and mechanical connection with the electric vehicle, wherein
   the electromechanical connecting arm is arranged below a middle of the collector trolley,
   the collector trolley is electrically and mechanically connected to the electric vehicle through the electromechanical connecting arm, and a mechanical connection between the electromechanical connecting arm and the collector trolley is achieved using a universal joint,
   the electromechanical connecting arm is connected to the electric vehicle,
   the electromechanical connecting arm is provided with a retraction spring mechanism, a recovery wheel rope winder with a clockwork spring, and an interface for power supply and charging,
   the first contact slide rail and the second contact slide rail are arranged above two sides of a road,
   the collector trolley is arranged at a middle of a rear top of the electric vehicle; a point of force at which the trolley is pulled is at a center below the trolley, four wheels at a front part and a rear part of the trolley rotate left and right by a rotation angle, which is limited to 15° or below,
   the first contact slide rail or the second contact slide rail is in corresponding fit with the wheels at a curve, lower portions of the wheels incline outwards by 5° to 25°, and the first contact slide rail or the second contact slide rail inclines correspondingly,
   a bottom of the collector trolley is connected to the collector shoe through a spring,
   the collector trolley is placed in a space directly above the first contact slide rail or the second contact slide rail,
   the first contact slide rail or the second contact slide rail is capable of being properly pressed by the collector trolley by means of gravitational potential energy of the electric vehicle via the retraction spring mechanism of the electromechanical connecting arm, and
   the retraction spring mechanism is placed inside the electromechanical connecting arm.

2. The mobile solar power supply and charging facility for the electric vehicle according to claim 1, wherein anti-collision buffer apparatuses are installed at two ends of the collector trolley.

3. The mobile solar power supply and charging facility for the electric vehicle according to claim 1, further comprises: a solar photovoltaic power generation facility, which is arranged above a charging line at a side of the road; a solar photovoltaic cell panel is provided with a compensation reflector for increasing solar power generation amount.

4. The mobile solar power supply and charging facility for the electric vehicle according to claim 1, further comprises: a solar photovoltaic power generation facility, which is installed beside the road and provided with a composite condenser lens for light condensation without electromechanical tracking, and a convex type compensation reflector.

5. The mobile solar power supply and charging facility for the electric vehicle according to claim 1, wherein a mechanical and electrical interface, which matches with the facility and is controlled by electromagnetic force and provided with a protection apparatus, is installed at a tail of an electric vehicle to be powered and charged.

6. The mobile solar power supply and charging facility for an electric vehicle according to claim 1, wherein the first contact slide rail and the second contact slide rail are provided with an apparatus for the collector trolley to enter and exit, comprising: a cableway arranged above the first contact slide rail and the second contact slide rail, a collector trolley which is not used being hung on the cableway, and a collector trolley to be used being placed on the first contact slide rail and the second contact slide rail.

\* \* \* \* \*